United States Patent [19]

Reed

[11] 4,130,042
[45] Dec. 19, 1978

[54] ADJUSTABLE ANVIL ROLL FOR DIE-CUTTING LABELS

[75] Inventor: Charles F. Reed, Painesville, Ohio

[73] Assignee: Avery International Corporation, San Marino, Calif.

[21] Appl. No.: 818,546

[22] Filed: Jul. 25, 1977

[51] Int. Cl.² .................... B26F 1/42; B26D 3/08
[52] U.S. Cl. ...................................... 83/887; 83/881; 83/344; 100/168
[58] Field of Search .............. 83/344, 8, 12; 72/452; 100/168

[56]  References Cited
U.S. PATENT DOCUMENTS

| | | | |
|---|---|---|---|
| 2,711,935 | 6/1955 | Miles | 83/344 X |
| 3,222,966 | 12/1965 | Tornberg et al. | 83/344 X |
| 3,276,306 | 10/1966 | Winkler et al. | 83/344 X |
| 3,289,513 | 12/1966 | Johnson et al. | 83/344 |
| 3,606,811 | 9/1971 | Hallden | 83/344 X |
| 3,691,810 | 9/1972 | Sendzimir | 83/344 X |

*Primary Examiner*—J. M. Meister
*Attorney, Agent, or Firm*—Christie, Parker & Hale

[57]  ABSTRACT

A die-cutter assembly including a die-cutting roll and an anvil roll between which a web of material is passed for die-cutting of labels. Spacing between the rolls is controlled by a pair of bearings at each end of one of the rolls, each pair including an inner bearing in which the roll is journaled and an outer bearing which is in rolling contact with the die-cutting roll. A rotatable eccentric spacer between the inner and outer bearings provides an adjustment of the spacing between the axis of the cutting roll and the axis of the anvil roll.

10 Claims, 5 Drawing Figures

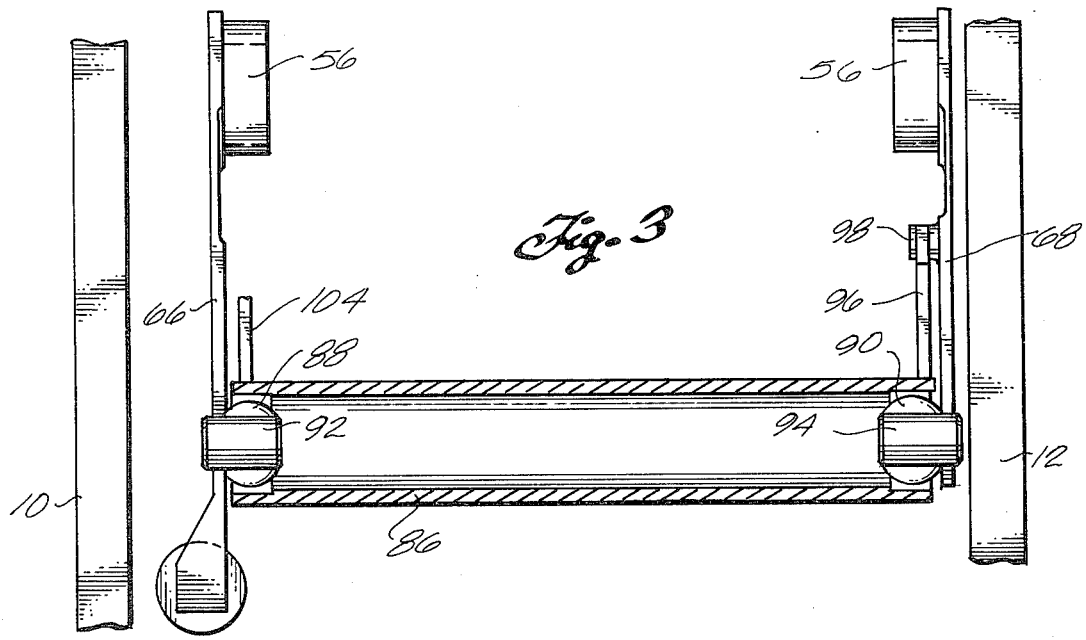
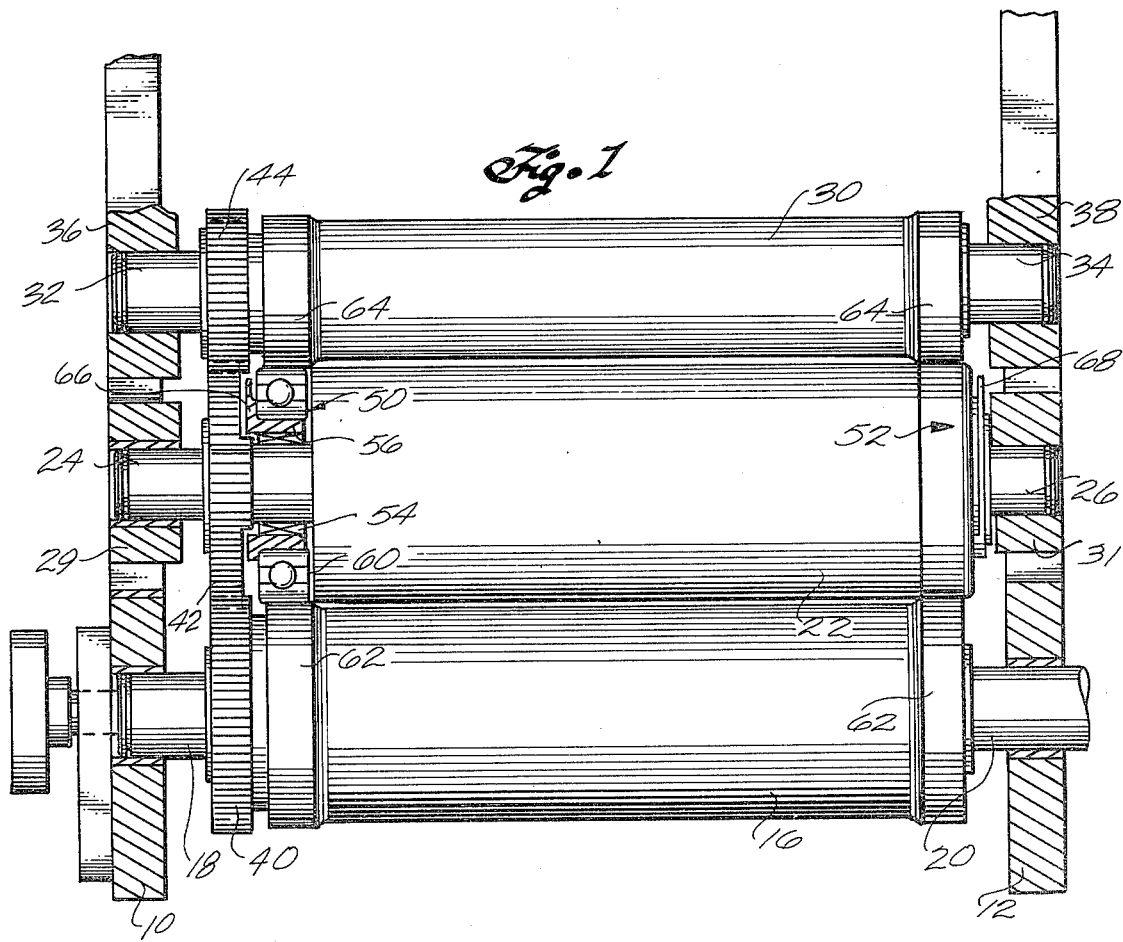

ADJUSTABLE ANVIL ROLL FOR DIE-CUTTING LABELS

FIELD OF THE INVENTION

This invention relates to die-cutting roll presses, and more particularly, to apparatus for adjusting the axial spacing between the anvil roll and die-cutting roll of a press.

BACKGROUND OF THE INVENTION

It is well known to use roll type die cutters to cut labels from a continuous web of label stock. Label stock consists of laminated strips of label material which may be printed, a coating of pressure-sensitive adhesive, and a carrier or backing strip which is coated with a release coating permitting it to be peeled away from the adhesive coated label material. Die cutting requires accurate spacing between the die-cutting roll and the anvil roll so that the die cutter penetrates the label material and adhesive to form the individual labels but not the backing strip, so that after passing through the die cutter the matrix of label material from between the labels can be peeled away, leaving the individual labels adhering to the continuous backing strip. An extremely accurate adjustment of the spacing between the anvil roll and the cutters is required to insure that the cutters cut through the label material cleanly without cutting into the carrier strip. Since the carrier strip itself may vary in thickness from one roll of label stock to the next, maintaining such accurate penetration of the cutters has presented a problem. In the past, the spacing between the cutters and the anvil roll has been maintained by providing slightly larger diameter regions at either end of the respective rolls which are in direct rolling contact. These portions can be accurately machined to maintain an exact spacing between the surface of the anvil roll and the edges of the cutters. However, if a wider spacing is required to allow for variations in the thickness of the carrier strip, for example, the rolls must be replaced. If a closer spacing is required, the rolls must either be replaced with another set of rolls or machined to reduce the diameter of the rolling contact portions. In either case, the rolls must be removed from the press, a costly and time-consuming operation.

SUMMARY OF THE INVENTION

The present invention is directed to an arrangement in which the spacing between the anvil roll and the cutter roll can be adjusted without removing the rolls from the press. Spacing is maintained during the roll cutting operation by providing rolling contact between slightly larger diameter regions at either end of the rolls. The adjustment mechanism of the present invention permits existing roll presses to be easily modified to permit precise stable adjustment of the anvil roll relative to the cutter roll. The adjustment mechanism is incorporated as part of either the anvil roll or the die-cutter roll, thus permitting an existing press to be retrofitted with the adjustment mechanism by replacing one of the rolls with an adjustable roll assembly incorporating the features of the present invention.

This is accomplished in brief by providing an anvil roll assembly, for example, in which the shaft ends of the anvil roll are journaled in inner bearings, the bearings being mounted in adjusting brackets. The brackets in turn are journaled in outer bearings held by the brackets in eccentric relation to the inner bearings. The cutter roll is in rolling contact with the outer bearings. Rotation of the brackets about the axis of the anvil roll rotates the eccentric displacement between the inner and outer bearings, thereby changing the spacing between the axes of the two rollers.

DESCRIPTION OF THE DRAWINGS

For a more complete understanding of the invention reference should be made to the accompanying drawings, wherein:

FIG. 1 is an elevational view, partly in section, of a rotary press incorporating the features of the present invention;

FIG. 3 is a partial view taken along the line 3—3 of FIG. 2;

DETAILED DESCRIPTION

Figure 2:
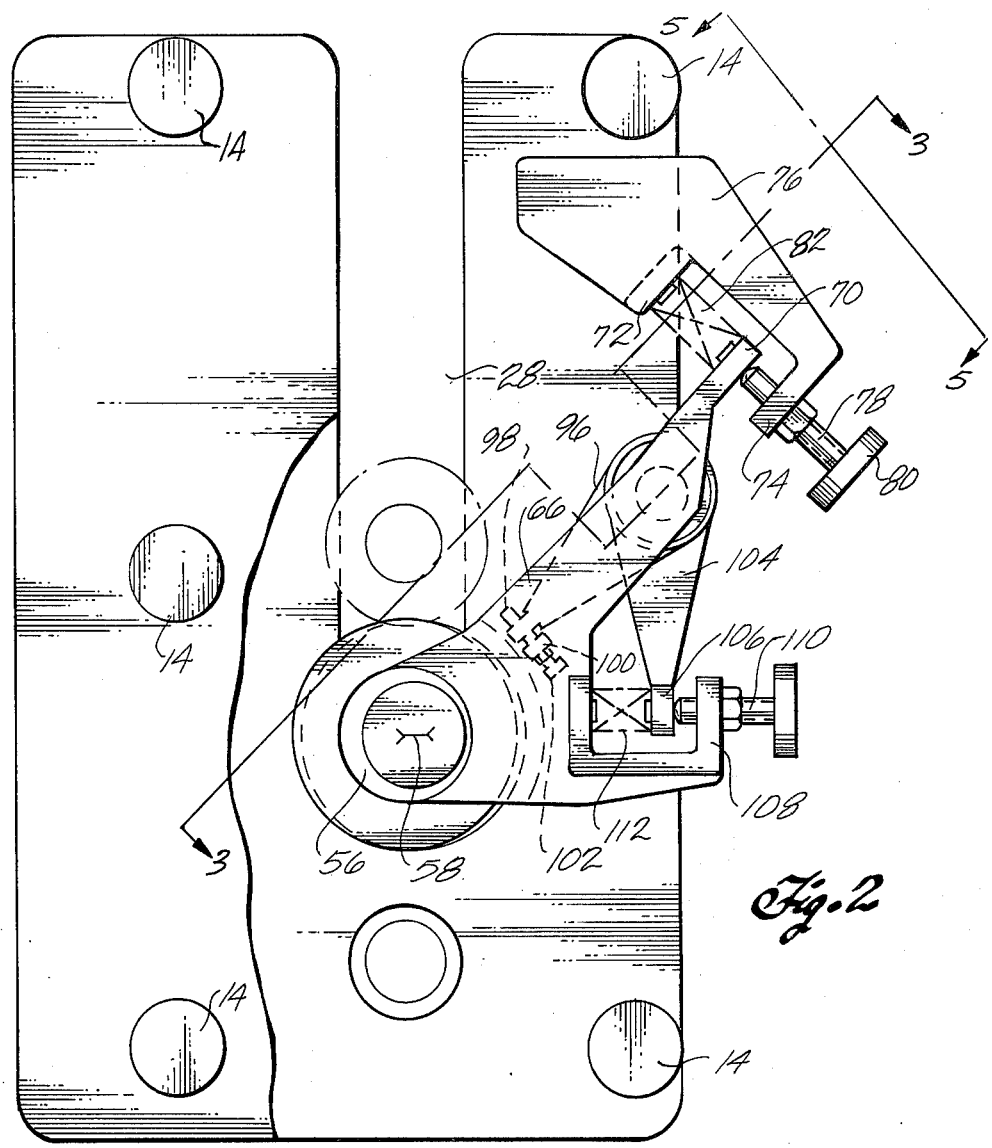
FIG. 2 is an end view, partially cut away, of the rotary press.

Referring to the drawings in detail, the numerals 10 and 12 indicate a pair of spaced parallel frame plates of a conventional roll press. The frame plates 10 and 12 are held in spaced parallel relationship by a plurality of rigid cross bars, the ends of which are indicated at 14. A drive roll 16 has shaft ends 18 and 20 journaled in bearings supported by the frame plates 10 and 12. The shaft end 20 is connected to a suitable motor drive (not shown).

An anvil roll 22 is positioned above the drive roll. The anvil roll has a pair of shaft ends 24 and 26 extending from either end which are journaled in bearing blocks 29 and 31 slidably supported for vertical movement in slots 28 in the frame plates 10 and 12. The slots are vertically aligned with the drive roll axis. Thus the axis of the anvil roll cannot move laterally but can move vertically by moving the supporting bearing blocks in the slots.

A cutting roll 30 is mounted above the anvil roll and is similarly provided with shaft ends 32 and 34 which are journaled in bearing blocks 36 and 38, respectively. The bearing blocks are also movable vertically in the slots 28 above the blocks 29 and 31 so as to permit relative adjustment in the vertical spacing between the axis of the anvil roll and the axis of the cutting roll.

The anvil roll and cutting roll are driven from the drive roll by a gear drive arrangement including a gear 40 secured to one end of the drive roll, a mating gear 42 keyed to the shaft 24 of the anvil roll, and a mating gear 44 secured to the end of the cutting roll. In operation, label stock is passed between the anvil roll and cutting roll. Knife edges formed on the surface of the cutting roll provide the die-cutting operation for cutting the individual labels.

The vertical spacing between the axis of the cutting roll and the anvil roll, as well as between the axis of the anvil roll and the drive roll, is provided by bearing assemblies mounted on the end shafts 24 and 26 of the anvil roll 22, as indicated generally at 50 and 52. It will be understood that while the preferred embodiment is described for the anvil roll to be adjustable, the adjustable bearing assemblies may be used to make the cutter roll adjustable. The cam assemblies 50 and 52 each include an inner bearing 54 which preferably is a needle bearing in which the shaft 24 is journaled. The bearing 54 is surrounded by an annular cam member 56 having inner and outer cylindrical surfaces which are slightly eccentric with respect to each other, that is, the respective axes of revolution of the inner and outer cylindrical surfaces are offset, as indicated at 58 in FIG. 2. A ball bearing assembly 60 has its inner race mounted on the outer surface of the eccentric cam 56. The outer race of the ball bearing assembly 60 is in rolling contact with bearer regions 62 and 64 at either end of the respective drive roll 16 and cutting roll 30. Thus the ball bearing assembly 60 maintains fixed spacing between the axis of the cutting roll 30 and the axis of the drive roll 16. However the axis of the anvil roll 22 relative to the axes of the drive roll and cutting roll is variable depending upon the angular position of the eccentric cam 56 of the respective assemblies 52. Since the axis of revolution of the ball bearing assembly 60 is displaced from the axis of revolution of the bearing 54 by the amount of eccentricity of the cam 56, as indicated at 58, rotation of the eccentric cam 56 causes a change in the vertical and horizontal components of the displacement 58. However, the axis of the inner bearing 54 and anvil roll 22 can only move vertically and not horizontally relative to the frame members 10 and 12, because the bearing blocks 29 and 31 are constrained to move only vertically in the slots 28. Thus rotation of the eccentric cams 56 causes vertical displacement of the anvil roll relative to the cutting roll and drive roll while producing horizontal displacement of the ball bearing assembly 60.

Rotation of the eccentric cams 56 is provided by radius arms 66 and 68. As best seen in FIG. 2, the outer end of the radius arm 66 terminates in an adjusting finger 70 which projects into a gap formed by spaced parallel jaws 72 and 74 of an adjusting bracket 76. The bracket 76 is bolted or otherwise secured to the inside surface of the frame plate 10. The position of the finger 70 is adjusted by means of a thumb screw 78 having a knurled knob 80. The end of the adjusting screw 78 bears against the finger 70 under the action of a compression spring 82 extending between the finger 70 and the jaw 72. The axis of the screw 78 extends substantially perpendicular to the radius of the eccentric cam 56 so that displacement of the finger 70 by the adjusting screw 78 produces slight angular rotation of the eccentric cam 56.

Figure 4:
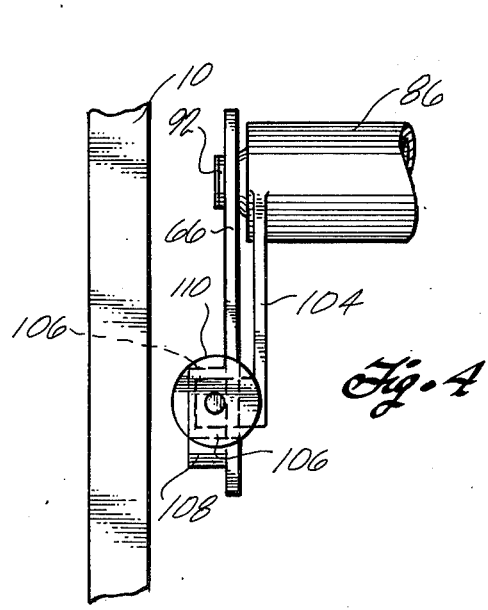
FIG. 4 is a partial view taken along the line 4—4 of FIG. 2.
Figure 5:
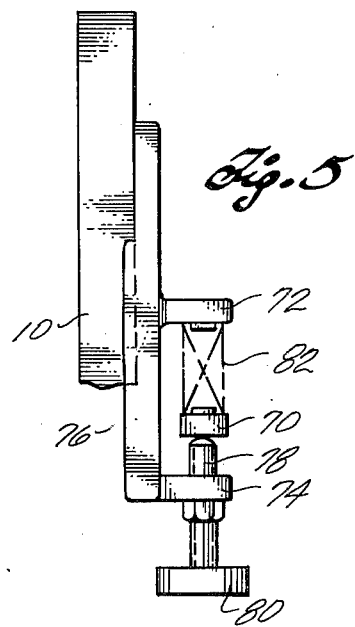
FIG. 5 is a partial view taken along the line 5—5 of FIG. 2.

Rotation of the radius arm 68 is provided by a linkage which interconnects the arm 68 to the arm 66 so that adjustment of the arm 66 by the adjustment screw 78 also adjusts the angle of the arm 68. The linkage also provides for independent adjustment of the arm 68. This linkage is best shown in FIGS. 3 and 4. The linkage connecting the radius arms 66 and 68 includes a tubular connector 86. The tubular connector is joined at either end to the respective arms 66 and 68 by spherical bearings 88 and 90 which slidably engage pins 92 and 94 projecting from the arms 66 and 68, respectively. The spherical bearings permit the two arms to rotate relative to each other.

The connector tube 86 is keyed to the arm 68 at one end by a bracket 96 extending radially from the end of the connector 86. The outer end of the bracket 96 extends between a pair of lugs 98 and 100 projecting from the arm 68. It is clamped by the lugs by a set screw 102. Thus the connector rod is held against axial rotation relative to the radius arm 68.

A similar bracket 104 is secured to the other end of the tubular connector 86. The outer end of the bracket 104 has an integral finger 106 which extends between the ends of a U-shaped bar 108 integral with the radius arm 66. A thumb screw 110 moves the finger 106 against a compression spring 112. It will be seen that adjustment of the thumb screw 110 changes the angle of the bracket 104 relative to the radius arm 66 about the axis of the pin 92. The spherical bearing 88 acts as a fulcrum so that movement of the bracket 104 causes the other end of the tubular connector 86 to move in an arc about the axis formed by the line extending between the center of the spherical bearing 88 and the center of the cam 56 associated with the radius arm 68. Thus the effect of adjusting the thumb screw 110 is to change the angle of the radius arm 68 relative to the radius arm 66 about the axis of rotation of the anvil roll 22.

From the above description it will be seen that a self-contained anvil roll adjuster is provided. The adjuster assembly can be added to an existing press, for example, merely by replacing the standard anvil roll, with the anvil roll and associated assemblies 50 and 52 and associated radius arms and linkage, in the bearing blocks 29 and 31 and mounting the bracket 76 on the inside of the frame plate 10. The anvil roll adjuster of the present invention provides extremely accurate adjustment of the spacing between the anvil roll and the cutting roll by a simple manual adjustment. The adjustment can be made to extremely close tolerances, permitting easy correction for wear of the cutters on the cutting roll or for variations in thickness of the web material passing through the die-cutter rolls. Since the relative spacing between the anvil roll and cutter roll is being adjusted, it will be understood that the adjuster of the present invention may be used on the cutter roll rather than the anvil roll. The invention is applicable to other types of roll press devices which require accurate yet frequent adjustment in roll spacing, such as in creasing, scoring, embossing and other types of web fed operations. Also it will be appreciated that the present invention lends itself to automatic as well as manual adjustment. For example, the adjustment screw may be driven by a motor which is part of a closed loop servo which includes a sensor for measuring variations in the thickness of the backing material and automatically adjusts the spacing between the cutter and anvil to accommodate such variations.

What is claimed is:

1. A roll cutter assembly comprising a pair of rolls having cylindrical bearing portions at the ends of the rolls, the cylindrical bearing portion of one of said pair of rolls being in rolling contact with the cylindrical bearing portion of the other roll to maintain fixed spacing between the rolls, the cylindrical bearing portions of the first roll each including an outer annular bearing having an outer circular surface in rolling contact with one of the bearing portions of the second roll, an inner bearing, the first roll being journaled in the inner bearings, an annular eccentric cam having inner and outer cylindrical eccentric surfaces positioned between the inner and outer bearings, whereby the inner bearing is mounted eccentrically within the outer bearing, and means for adjusting the angular positions of the cams to vary the distance between the rolls.

2. Apparatus of claim 1 further including means linking the two cams for rotating the two cams simultaneously by equal amounts.

3. Apparatus of claim 2 wherein said linking means further includes means for adjusting one cam relative to the other.

4. A die cutter assembly including a frame, a first roll, a second roll, bearing means at the end of the second roll including an outer ring having a cylindrical surface in rolling contact with the first roll, an annular cam member having eccentric inner and outer cylindrical surfaces, whereby the radial distance between the inner and outer surfaces varies with the angular position around the circumference of the annular cam between a maximum and a minimum radial distance at diametrical opposite positions, the ring being rotatably supported on the outer surface of the cam member, said second roll being journaled at each end in the inner surface of the two cam members, means rotatably supporting the rolls on the frame with their axes parallel to each other, said means restricting relative movement of the rolls toward and away from each other with the axes of rotation confined to a fixed plane, and means for rotating the cam members relative to the frame to vary the radial distance between the inner and outer surfaces of the cam members as measured in said fixed plane defined by the axes of the two rolls.

5. The apparatus of claim 4 including means linking the two cam members for rotating both cam members together simultaneously.

6. Apparatus of claim 5 wherein said linking means further includes means for adjusting one cam member relative to the other.

7. In a roller die press in which a web of material is passed between a die cutting roll and an anvil roll which are driven in opposite directions and have their axes relatively movable for changing the spacing between the rolls, apparatus for providing adjustable spacing between the rolls comprising: a pair of roller assemblies positioned at either end of and supported by one of the rolls, each of the roller assemblies including an eccentric annular cam member forming inner and outer eccentrically related surfaces, means rotatably supporting the cam members from said inner surface on the ends of said one of the rolls, an outer annular ring in rolling contact with the other roll, means rotatably supporting the ring on the outer surface of the cam member, and means connected to the cam members of both roller assemblies for adjusting the angular position of the annular cam members relative to the press to vary the spacing between the rolls.

8. Apparatus of claim 7 wherein each roller assembly includes a ball bearing having inner and outer races, the outer race forming said outer ring, the inner race being mounted on the outer surface of the cam.

9. Apparatus of claim 8 wherein the adjusting means includes radius arms secured to and supported by the respective cams, and means connecting the two radius arms together for causing the cams to rotate as a unit.

10. Apparatus of claim 9 wherein said means connecting the two radius arms includes means for adjusting the skew angle between the two arms.

* * * * *